US011898400B2

(12) United States Patent
Zhang et al.

(10) Patent No.: US 11,898,400 B2
(45) Date of Patent: Feb. 13, 2024

(54) FRAME DOOR WITH SPLIT CONNECTION FRAME

(71) Applicant: Ningbo Tengyu Metal Product Co., Ltd., Ningbo (CN)

(72) Inventors: Liujian Zhang, Ningbo (CN); Junhua Jiang, Ningbo (CN); Peike Zhang, Ningbo (CN); Yechen Xu, Ningbo (CN); Zhewei Wu, Ningbo (CN); Xiaobin He, Ningbo (CN)

(73) Assignee: Ningbo Tengyu Metal Product Co., Ltd., Ningbo (CN)

( * ) Notice: Subject to any disclaimer, the term of this patent is extended or adjusted under 35 U.S.C. 154(b) by 0 days.

(21) Appl. No.: 17/903,680

(22) Filed: Sep. 6, 2022

(65) Prior Publication Data

US 2023/0074697 A1 Mar. 9, 2023

(30) Foreign Application Priority Data

Sep. 6, 2021 (CN) ......................... 202111038090.X

(51) Int. Cl.
*E06B 3/72* (2006.01)
*E06B 3/96* (2006.01)
*E06B 3/70* (2006.01)

(52) U.S. Cl.
CPC ................ *E06B 3/96* (2013.01); *E06B 3/725* (2013.01); *E06B 2003/7086* (2013.01)

(58) Field of Classification Search
CPC .......... E06B 3/7003; E06B 3/72; E06B 3/725; E06B 3/96; E06B 3/9636; E06B 2003/7011; E06B 2003/7074; E06B 2003/7082; E06B 2003/7086; E06B 2003/7059
See application file for complete search history.

(56) References Cited

U.S. PATENT DOCUMENTS

| | | | | | |
|---|---|---|---|---|---|
| 3,561,801 | A * | 2/1971 | Chiu | ..................... | F16B 7/0446 403/264 |
| 7,131,244 | B1 * | 11/2006 | Bradwell | ................ | E06B 5/003 52/656.2 |
| 9,366,072 | B1 * | 6/2016 | Orozco Aguayo | ..... | E06B 3/964 |
| 11,293,214 | B2 * | 4/2022 | Ostroviak | ................. | E06B 3/78 |
| 11,466,509 | B2 * | 10/2022 | Zhang | ........................ | E06B 3/72 |
| 2023/0074697 | A1 * | 3/2023 | Zhang | ........................ | E06B 3/72 |

FOREIGN PATENT DOCUMENTS

| | | | | | |
|---|---|---|---|---|---|
| CN | 102733726 | A | * 10/2012 | ........... | E05D 15/242 |
| CN | 108547549 | A | * 9/2018 | | |
| EP | 2492435 | A2 | * 8/2012 | .............. | E06B 11/02 |
| GB | 2310240 | A | * 8/1997 | ........... | E06B 3/9616 |
| KR | 20090126400 | A | * 12/2009 | | |
| KR | 101871475 | B1 | * 6/2018 | | |

* cited by examiner

*Primary Examiner* — Ryan D Kwiecinski
(74) *Attorney, Agent, or Firm* — Brown & Michaels, PC

(57) ABSTRACT

A frame door with a split connection frame is provided, including a split connection frame. The split connection frame includes a first connection frame which is provided in a frame door and a second connection frame which is provided in an other frame door. The first connection frame is provided with a slide rail groove, the second frame is provided with a slide plate which engages with the slide rail groove. The slide rail groove has a C-shaped cross section so as to wrap edges of the slide plate.

10 Claims, 13 Drawing Sheets

FRAME DOOR WITH SPLIT CONNECTION FRAME

CROSS REFERENCE TO RELATED APPLICATION

This patent application claims the benefit and priority of Chinese Patent Application No. 202111038090.X, entitled "FRAME DOOR WITH SPLIT CONNECTION FRAME" filed on Sep. 6, 2021, the disclosure of which is incorporated by reference herein in its entirety as part of the present application.

TECHNICAL FIELD

The present disclosure relates to the technical field of door and window structures, and particularly to a frame door with a split connection frame.

BACKGROUND ART

A door frame can be used as a transition layer between a wall body and a door, and plays a role of fixing a surrounding wall body and preventing the surrounding wall body from collapsing. Because the shape of the door board the is various, the material of the door frame is generally selected from a material with strong plasticity, such as wood or plastic. In prior art, the door frame is generally formed by welding and assembling four frames. When mounting a window frame, a worker usually first assembles the frames in the outdoors by welding to form the door frame, and then takes it to the user's room for indoor installation.

However, the welded door frame body is easily limited by the surrounding environment due to the large dimension thereof, so it is troublesome and not convenient enough during transferring the door frame. And, the traditional welding method is irreversible. When the joining angle of the door frame is deviated or other unexpected situations occur, the door frame cannot be disassembled for adjustment.

Accordingly, with respect to the described problem, Chinese Patent No. 211647779U discloses a fully-dispersed aluminum frame door, comprising an upper frame, a lower frame and two side frames. The upper frame, the lower frame and the two side frames are connected to form a rectangular frame. A plurality of glass spaced strips in an H-shape are mounted between the two side frames, and evenly spaced along a direction from the upper frame to the lower frame. Glass is respectively mounted between the upper frame and the glass spacer adjacent thereto, between the lower frame and the glass spacer adjacent thereto, and between every two glass spacers which are vertically adjacent to each other. Compared with the prior art, the solution of this patent can disperse and package a plurality of components, such as glass and profiles, thereby reducing the size of the package, and reducing the risk of damage during transportation. However, in the case of transferring all the dispersed frames together with the glass to be assembled to users, it is difficult and takes a long time to mount. After the glass is separated from the profile, the risk of breakage is increased during the transfer of the glass. Under the condition of the frames with the same dimension and the same strength, the wall thickness of the aluminum frame is much thicker than that of the iron frame, thereby increasing the cost of the aluminum frame.

In this regard, Chinese Patent No. 212562929U discloses a split iron frame door structure, comprising a top split frame, a middle split frame and a bottom split frame. The top frame and the two side frames of the top split frame, the two side frames of the middle split frame, the bottom frame and the two side frames of the bottom split frame are respectively thin-wall square tube frames. A first flat-iron frame is transversely fixed to the bottom edge of the top split frame. A second flat-iron frame is transversely fixed to the top edge of the middle split frame. A third flat-iron frame is transversely fixed to the bottom edge of the middle split frame. And, a fourth flat-iron frame is transversely fixed to the top edge of the bottom split frame. The first and second flat-iron frames are detachably connected with each other via a first H-shaped profile and several first connection screws. The third and fourth flat-iron frames are detachably connected with each other via a second U-shaped profile and several second connection screws. Compared with the prior art, the iron frame door structure adopts the split design, has low packaging and transport costs and a light overall weight. In addition, the iron frame door structure has a simple appearance and good light transmission. However, the flat-iron frames are connected with each other via screws merely, thus the precision is completely determined by the threaded holes of the screws. Additionally, the door can be suspended only after the flat-iron frames are connected to be an integral structure. Therefore, the weight of the door is increased and the mounting difficulty thereof is increased.

Therefore, with respect to the described problems existing in the prior art, it is necessary to improve the structure design of the connection frame. So, a split frame door is provided, which makes the mounting of the frame door more convenient, and improves the assembly accuracy of the frame door.

SUMMARY

The object of the present disclosure is to solve the described technical problem, and to provide a frame door with a split connection frame. By improving the structure design of the connection frame, the mounting of the frame door is more convenient and the assembly accuracy of the door frame is improved.

In order to achieve the described purpose, the present disclosure provides the following solution: providing a split connection frame, including a first connection frame which is provided in a frame door and a second connection frame which is provided in an other frame door. The first connection frame is provided with a slide rail groove, the second connection frame is provided with a slide plate which engages with the slide rail groove, the slide rail groove has a C-shaped section so as to wrap edges of the slide plate.

In some embodiments, the slide rail groove and the slide plate may be provided with first threaded holes and second threaded holes respectively, each of the first threaded holes may correspond to a corresponding one of the second threaded holes, and the slide rail groove and the slide plate are fixedly connected via bolts.

In some embodiments, each of the first connection frame and the second connection frame may be provided with cavities, each of the first threaded holes may be in communication with a first interior of a corresponding one of the cavities of the first connection frame and each of the second threaded holes may be in communication with a second interior of a corresponding one of the cavities of the second connection frame, each of the bolts may be connected to a corresponding one of the first threaded holes in the first interior and a corresponding one of the second threaded holes in the second interior.

In some embodiments, the cavities of each of the first connection frame and the second connection frame may comprise two cavities, and a gap between the two cavities of each of the first connection frame and the second connection frame may be configured to be a fixing groove for connecting a sheet material.

In some embodiments, each of the two cavities may be further provided with a connection structure connected with a perpendicular frame which is perpendicular to the first connection frame or the second connection frame.

In some embodiments, the connection structure may be a connection hole corresponding to the perpendicular frame.

In some embodiments, end openings of the cavities of the first connection frame and the cavities of the second connection frame may be provided with a plug, protrusions may be provided on the plug, each of the protrusions may be in in interference fit with a corresponding one of the end openings.

An assembled split frame door is provided in some embodiments, including multiple independent frame doors connected to each other. The frame doors are connected to each other via the above mentioned split connection frame.

The embodiments in the present disclosure achieves the following technical effects with respect to the prior art.

(1) In the embodiments, by using a split connection frame design and the sliding connection solution of the slide rail groove and the slide plate, on the one hand, the operation is convenient, the time and the labor are saved by the preset slide track during mounting process; on the other hand, the frame door is enable to be positioned in the mounting process via the preset slide track, thereby avoiding the assembly error caused by improper operation when the existing mounting method is used, and further improving the assembly accuracy.

(2) In the embodiments, by using the slide rail groove design in the C-shaped structure, the C-shaped structure of the slide rail groove is used to effectively wrap edges of the slide plate, thereby effectively shielding a splicing seam, and further saving an additional splicing-seam decorative cover or a splicing-seam decorative strip.

(3) In the embodiments, by using the structural design in which each of the first connection frame and the second connection frame is provided with two cavities, the gap between the two cavities of each of the first connection frame and the second connection frame is configured to be a fixing groove for connecting a sheet material. And, threaded holes on each of the first connection frame and the second connection frame communicates with the interior of a corresponding one of the cavities. Thus, on the one hand, each bolt can be connected to the corresponding threaded hole inside the cavity so as to hide the bolts and improve the aesthetic level. On the other hand, due to the position of the cavities, the bolts and the fixing grooves for connecting the sheet material are separately arranged, and the mounted bolts would not damage the original smooth structure in the fixing grooves, thereby avoiding an interference with the assembly of the sheet material in the fixing grooves.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

1 frame door, 11 split frame door, 2 split connection frame, 21 first connection frame, 22 second connection frame, 23 slide rail groove, 24 slide plate, 25 threaded hole, 26 bolt, 27 cavity, 28 fixing groove, 29 plug, 210 connection hole, 3 perpendicular frame, 31 end connection plate, 32 fixing bolt hole, 33 fixing bolt.

DETAILED DESCRIPTION OF THE EMBODIMENTS

The technical solutions according to the embodiments of the present disclosure will be clearly and completely described below with reference to the accompanying drawings according to the embodiments of the present disclosure. Obviously, the described embodiments are only a part of the embodiments of the present disclosure, but not all of the embodiments. Based on the embodiments of the present disclosure, all other embodiments obtained by those of ordinary skill in the art without creative efforts shall fall within the protection scope of the present disclosure.

An object of the present disclosure is to provide a frame door with a split connection frame. By improving the structure design of the connection frame, the mounting of the frame door is more convenient and the assembly accuracy of the door frame is improved.

In order to make the above objects, features and advantages of the present disclosure more apparent, the present disclosure will be further described in detail below with reference to the accompanying drawings and embodiments.

Figure 1:
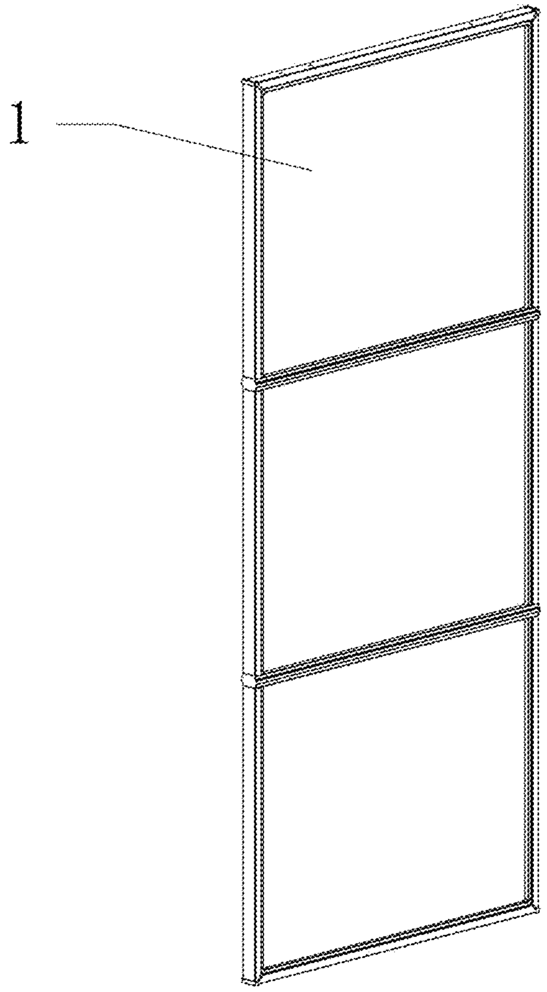
FIG. 1 is a structural schematic diagram of an assembled frame door according to the embodiments of the present disclosure.
Figure 2:
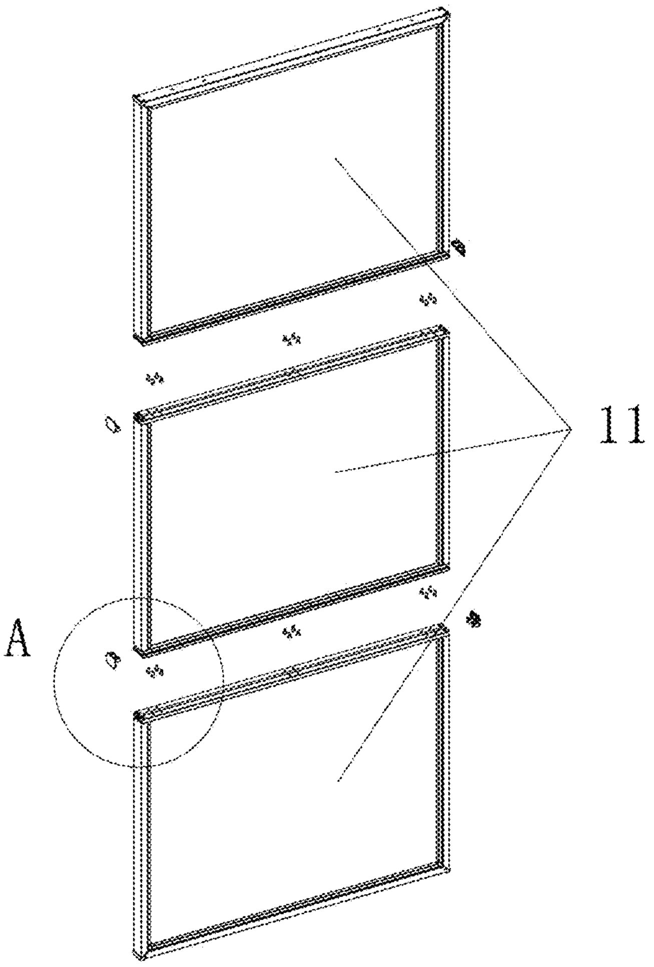
FIG. 2 is an exploded view of the structure shown in FIG. 1.
Figure 3:
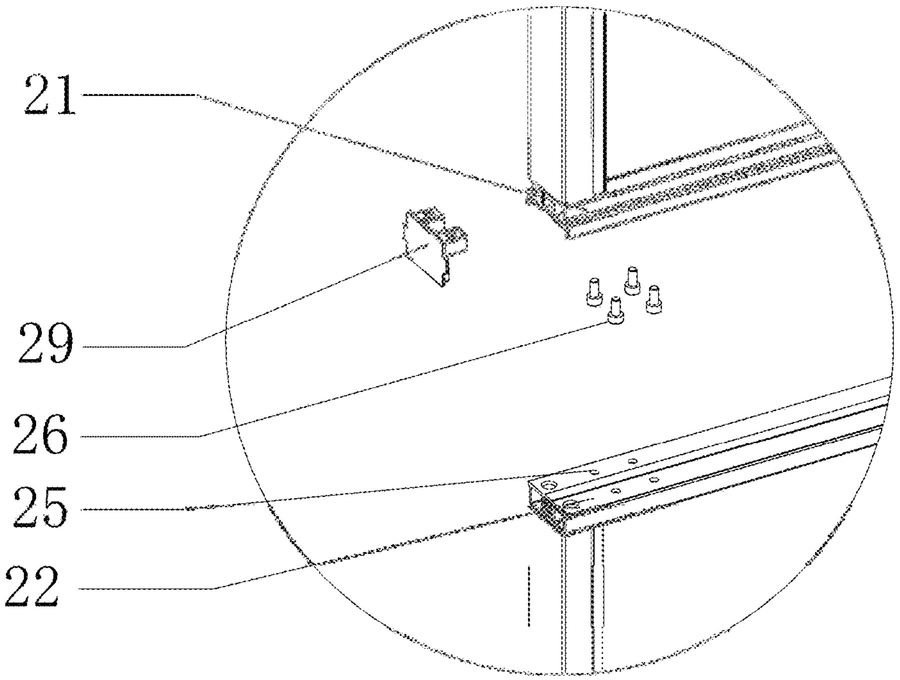
FIG. 3 is a partial enlarged view of region A in FIG. 2.
Figure 4:
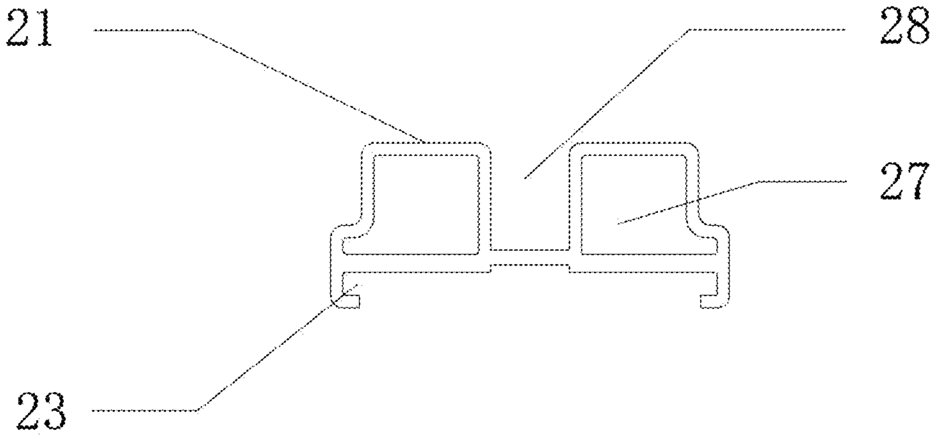
FIG. 4 is a schematic cross-sectional view of a first connection frame according to the embodiments of the present disclosure.
Figure 5:
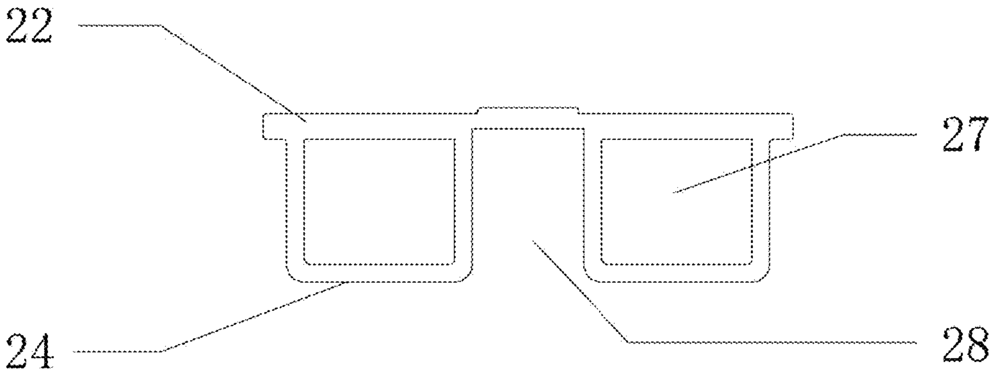
FIG. 5 is a schematic cross-sectional view of a second connection frame according to the embodiments of the present disclosure.
Figure 6:
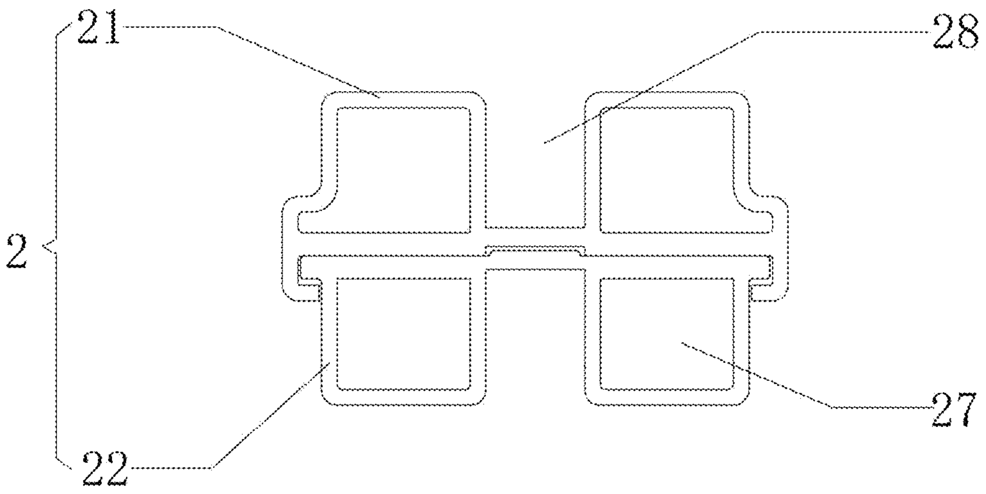
FIG. 6 is a schematic cross-sectional view of a split connection frame according to the embodiments of the present disclosure.
Figure 7:
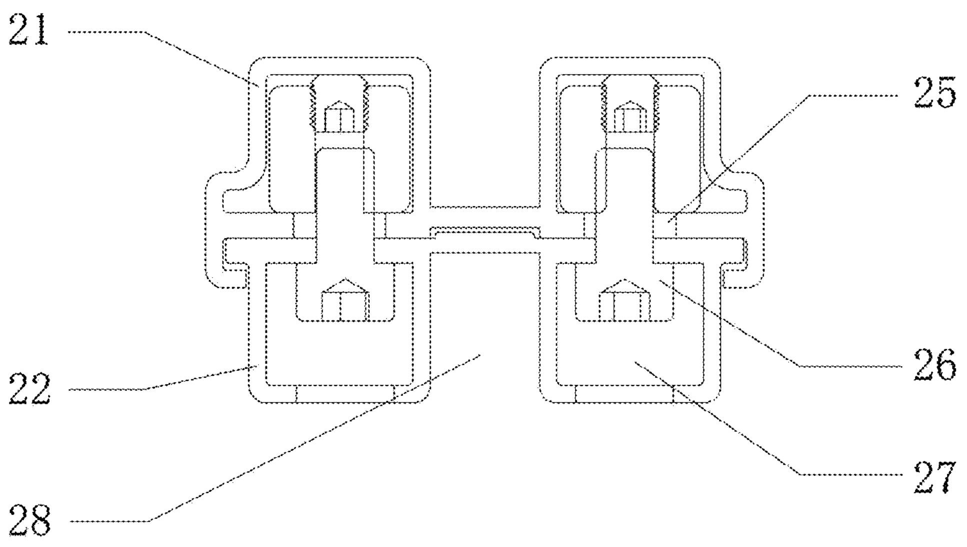
FIG. 7 is a schematic diagram of a connection structure of the first connection frame and the second connection frame according to the embodiments of the present disclosure.
Figure 8:
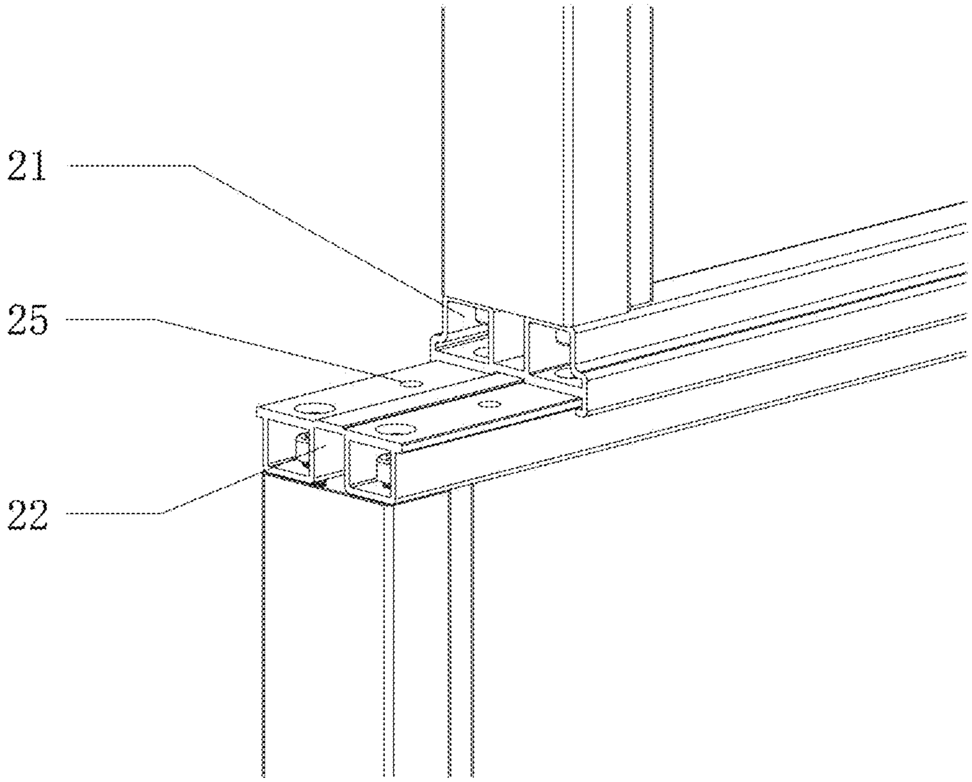
FIG. 8 is a schematic diagram showing a process of connecting and fixing the first connection frame and the second connection frame according to the embodiments of the present disclosure.
Figure 9:
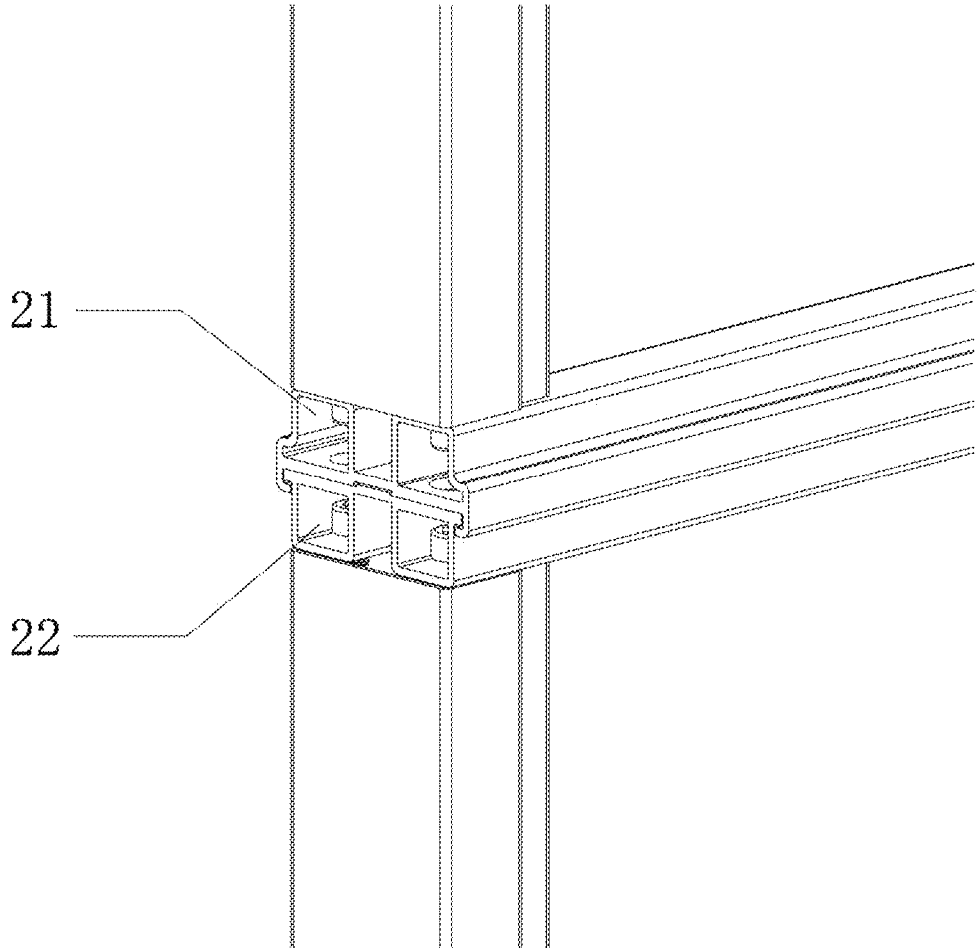
FIG. 9 is another schematic diagram showing the process of connecting and fixing the first connection frame and the second connection frame according to the embodiments of the present disclosure.
Figure 10:
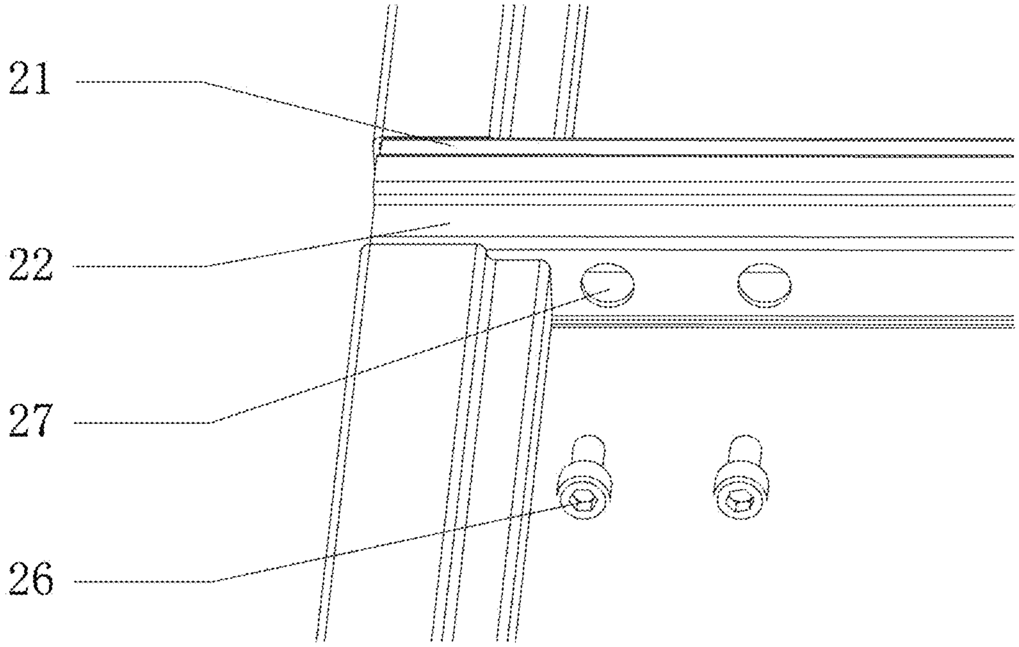
FIG. 10 is yet another schematic diagram showing the process of connecting and fixing the first connection frame and the second connection frame according to the embodiments of the present disclosure.
Figure 11:
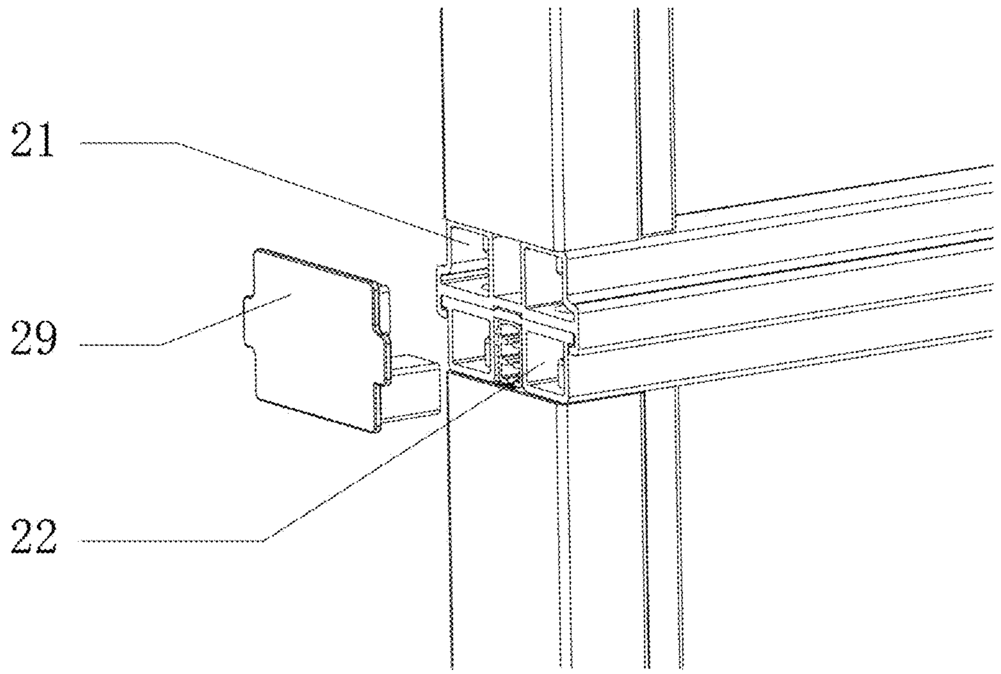
FIG. 11 is still another schematic diagram showing the process of connecting and fixing the first connection frame and the second connection frame according to the embodiments of the present disclosure.
Figure 12:
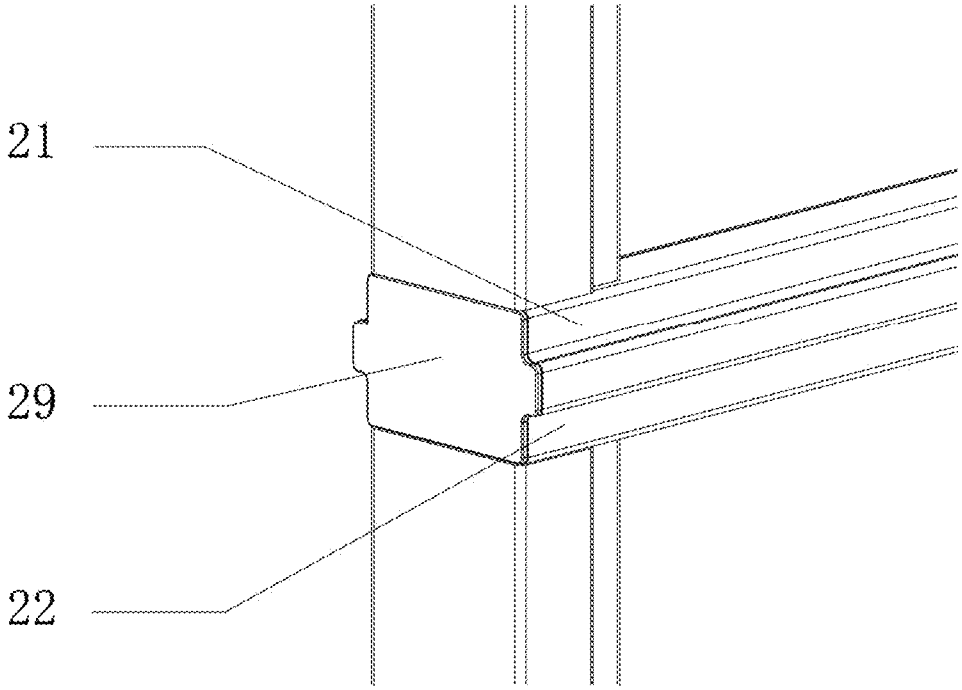
FIG. 12 is still another schematic diagram showing the process of connecting and fixing the first connection frame and the second connection frame according to the embodiments of the present disclosure.
Figure 13:
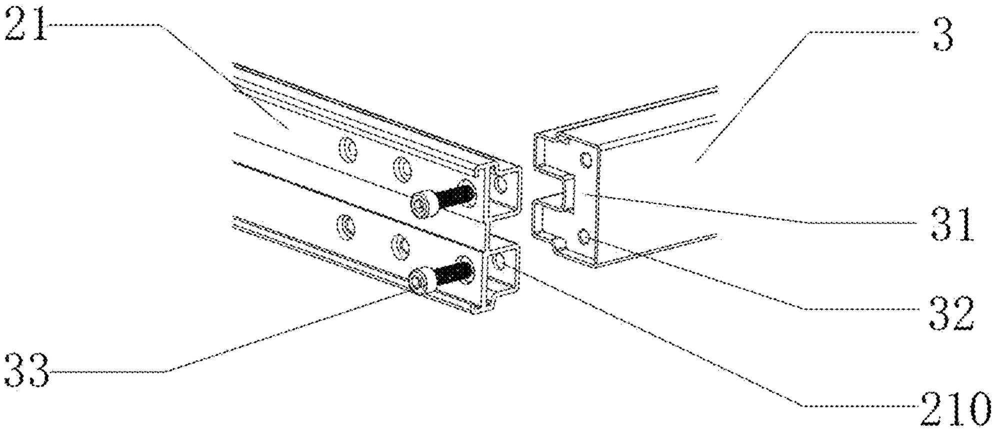
FIG. 13 is a structural schematic diagram showing a connection of the first connection frame and a perpendicular frame according to the embodiments of the present disclosure.
Figure 14:
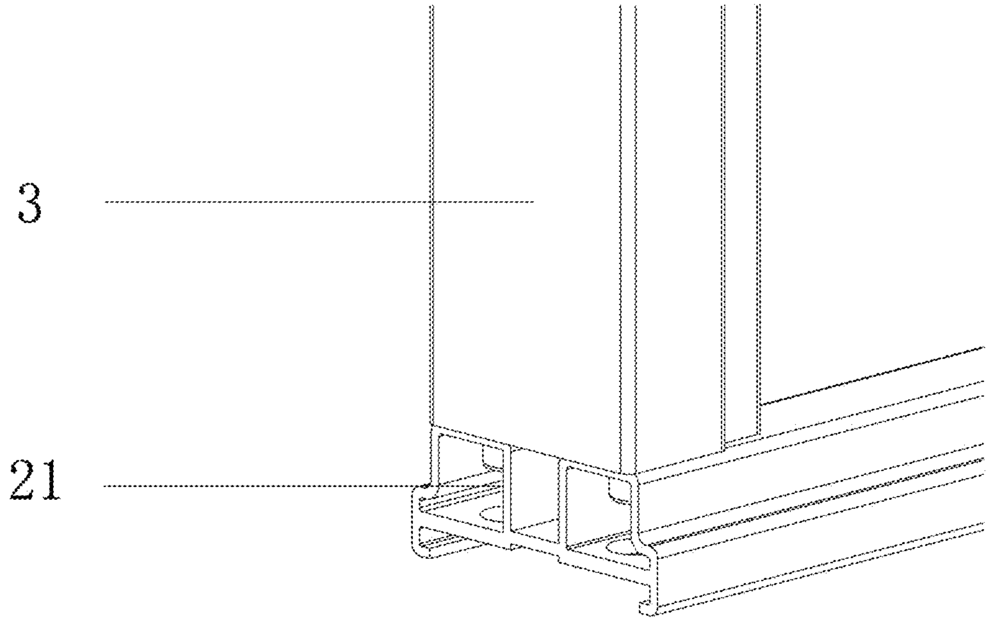
FIG. 14 is a structural schematic diagram showing a connection after the first connection frame is fixedly connected with the perpendicular frame according to the embodiments of the present disclosure.
Figure 15:
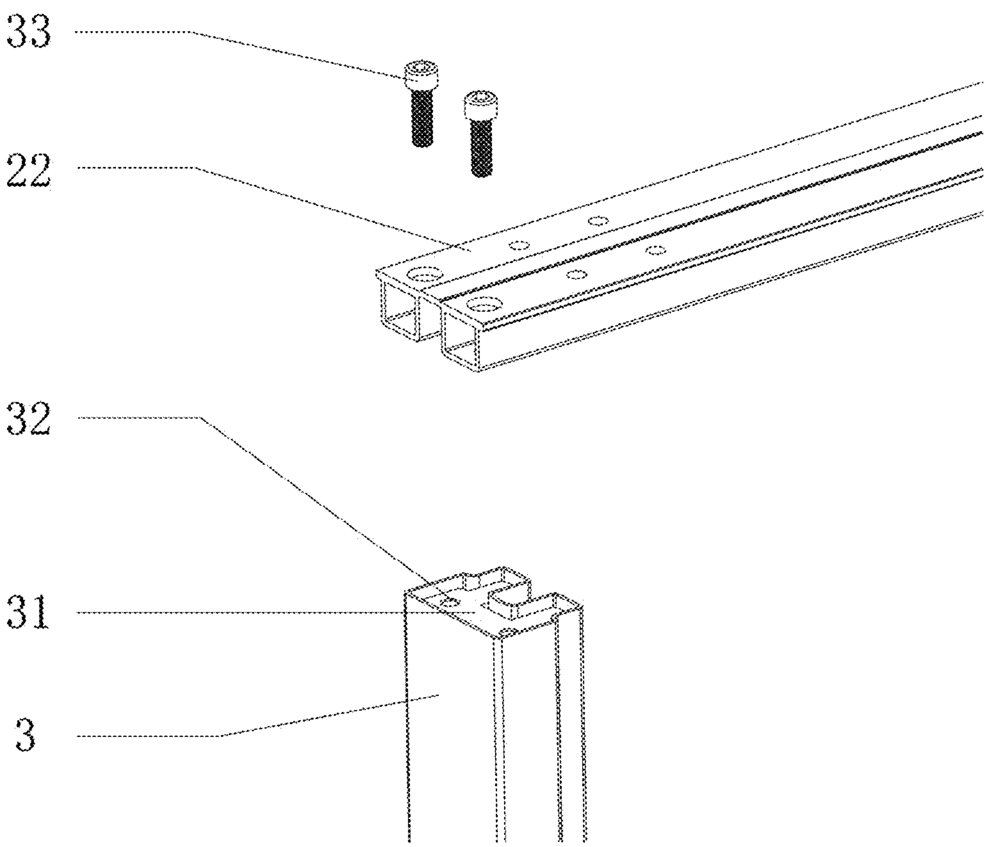
FIG. 15 is a structural schematic diagram showing a connection of the second connection frame and an other perpendicular frame according to the embodiments of the present disclosure.
Figure 16:
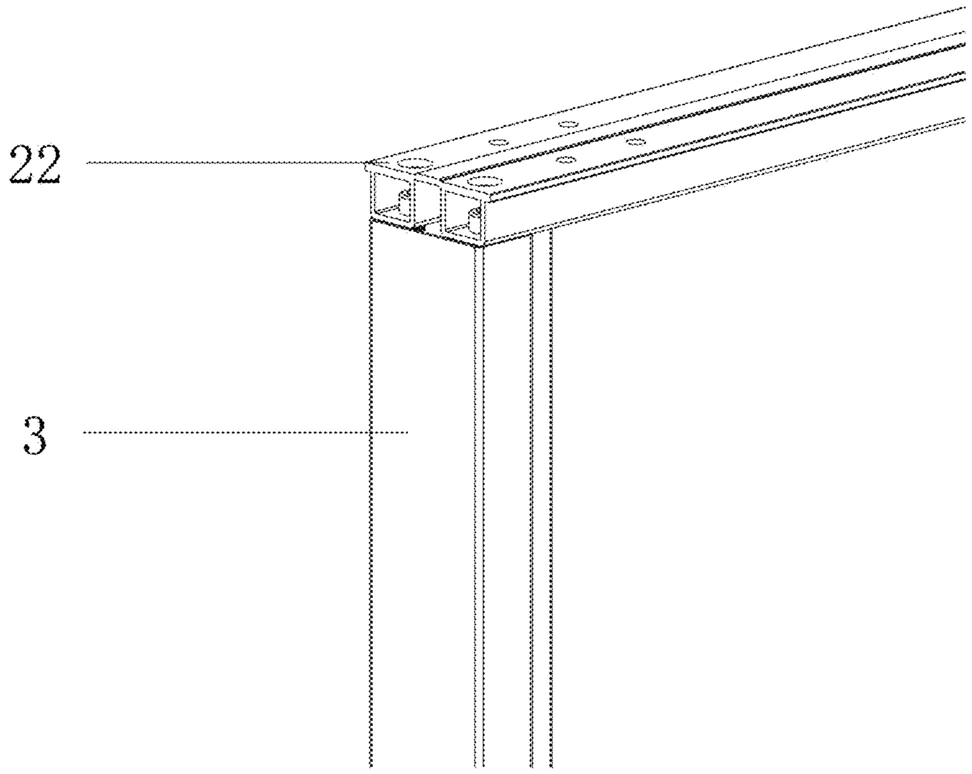
FIG. 16 is a structural schematic diagram showing a connection after the second connection frame is fixedly connected with the other perpendicular frame according to the embodiments of the present disclosure.

As shown in FIGS. 1 to 16, the present disclosure provides a split connection frame. As shown in FIGS. 1 and 2, the split connection frame 2 in the embodiments is arranged between the split frame doors 11 of the frame door 1, and is used for connecting the split frame doors 11.

As shown in FIGS. 3 to 7, the connection frame 2 includes a first connection frame 21 and a second connection frame 22. The first connection frame 21 is provided with a slide rail groove 23, and the second connection frame 22 is provided with a slide plate 24 engaged with the slide rail groove 23. The slide rail groove 23 has a C-shaped structure, so as to wrap the edges of the slide plate 24. The slide rail groove 23 and the slide plate 24 are provided with first and second threaded holes 25 respectively, each of the bolts 26 is enable to be screwed through the corresponding threaded holes 25 provided on slide rail groove 23 and the slide plate 24 respectively, thereby the first connection frame 21 is fixedly connected with the second connection frame 22. By means of a sliding connection manner of the slide rail groove 23 and the slide plate 24, on the one hand, the operation is convenient, time and labor are saved by the preset slide track during mounting process; on the other hand, the frame door is enable to be positioned in the mounting process via the preset slide track, thereby avoiding the assembly error caused by improper operation when using the existing mounting method and improving the assembly accuracy. In addition, the C-shaped structure of the slide rail groove 23 is enabled to effectively wrap edges of the slide plate 24, thereby the splicing seam is shielded effectively, and an additional splicing-seam decorative cover or a splicing-seam decorative strip is omitted.

Each of the first connection frame 21 and the second connection frame 22 is provided with two cavities 27. The gap between the two cavities 27 of each of the first connection frame 21 and the second connection frame 22 is configured to be the fixing groove 28 for connecting the sheet material. And each of the first threaded holes 25 is in communication with a first interior of a corresponding one of the cavities 27 of the first connection frame 21 and each of the second threaded holes is in communication with a second interior of a corresponding one of the cavities 27 of the second connection frame 22. Thus, on the one hand, one of the bolt 26 can be connected to the first threaded hole 25 in the first interior of the cavities 27, and the other ones of the bolts 26 can be connected to the second threaded holes in the second interior, so as to hide the bolts 26 and improve the aesthetic level. On the other hand, due to the position of the cavities 27, the bolts 26 and the fixing groove 28 for connecting the sheet material are separately arranged, and the mounted bolts 26 would not damage the original smooth structure in the fixing groove 28, thereby avoiding interference with the assembly of the sheet material in the groove 28. It should be noted that the cavities 27 may be a self-contained structure of the hollow first connection frame 21 and the hollow second connection frame 22, or may be a structure additionally provided only at the ends of the first connection frame 21 and the second connection frame 22.

As shown in FIGS. 8 to 12, during the mounting, the first connection frame 21 and the second connection frame 22 are first slidably connected via the slide plate 24 and the slide groove 23. In the embodiment, after each of the threaded holes 25 of the slide rail groove 23 is aligned with the corresponding one of threaded holes 25 of the slide plate 24, the bolts 26 enter the cavities 27 from the mounting openings provided on the cavities 27 of the first connection frame 21 or the second connection frame 22. And each of the bolts 26 are screwed into the cavities 27 aligned with the corresponding threaded holes 25, so that the fixing connection of the first connection frame 21 and the second connection frame 22 is completed. Further, end openings of the cavities 27 of the first connection frame 21 and the cavities of the second connection frame 22 are provided with a plug 29, protrusions are provided on the plug 29, each of the protrusions is in interference fit with a corresponding one of the end openings.

As shown in FIGS. 13 to 16, each of the cavities 27 is further provided with a connection structure connected with the perpendicular frame 3 which is perpendicular to the first connection frame 21 or the second connection frame 22. The connection structure is the connection hole 210 corresponding to the perpendicular frame 3.

Still further, an end connection plate 31 is provided in the end of the perpendicular frame 3. And a fixing bolt holes 32 is provided in the end connection plate 31, each of which corresponds to the corresponding one of the connection holes 210. During connection, each of the fixing bolt holes 32 on the end connection plate 31 at the end portion of the frame 3 is aligned with the corresponding one of the connection holes 210 provided on the first connection frame 21 or the second connection frame 22. Then each of the fixing bolts 33 enters the cavities 27 through the corresponding one of the mounting openings of the cavities of each of the first connection frame 21 or the second connection frame 22, and is respectively screwed into the corresponding one of the connection holes 210 and the corresponding one of the fixing bolt holes 32, so that the first connection frame 21 or the second connection frame 22 is enable to be fixedly connected with the perpendicular frame 3.

As shown in FIGS. 1 and 2, the present disclosure also provides an assembled split frame door 1, including three independent split frame doors 11 connected with each other via split connection frames 2.

In the embodiments, the sheet material, the top frame or the bottom frame, the perpendicular frame 3, and the first connection frame 21 and/or the second connection frame 22 of the split connection frame 2 are first assembled into one split frame door 11 via the bolt-nut structure. Workers only needs to slidingly connect the first connection frame 21 and/or the second connection frame 22 of the split connection frame 2 with the second connection frame 21 and/or the first connection frame 22 of the other split connection frame 2 and then fix them, the independent split frame doors 11 may be assembled into one frame door 1. Since the split connection frames 2 are used, and the split frame door 11 is spliced without misalignment, the operation is convenient, and the efficiency is improved. Meanwhile, no seam is formed in the spliced position, and the aesthetics of the frame door 1 is improved.

It should be noted that, for those skilled in the art, it is obvious that the present disclosure is not limited to the details of the above exemplary embodiments, and the present disclosure can be implemented in other specific forms without departing from the spirit or essential features of the present disclosure. Therefore, it is intended that the embodiments be considered in all respects as illustrative and not restrictive. The scope of the disclosure being indicated by the appended claims rather than by the foregoing description, and all changes that come within the meaning and range of equivalency of the claims are therefore intended to be embraced therein. Any reference numbers in the claims shall not be construed as limiting the claims referred to.

What is claimed is:

1. A split connection frame, comprising:

a first connection frame provided in a frame door; and a second connection frame provided in an other frame door, the first connection frame provided with a slide rail groove, the second connection frame provided with a slide plate, the slide plate engaging the slide rail groove, the slide rail groove having a C-shaped cross section so as to wrap edges of the slide plate, the slide rail groove and the slide plate provided with first threaded holes and second threaded holes respectively, each of the first threaded holes corresponding to a respective one of the second threaded holes, and the slide rail groove and the slide plate fixedly connected via bolts, and each of the first connection frame and the second connection frame provided with cavities, each of the first threaded holes in communication with a first interior of a corresponding one of the cavities of the first connection frame and each of the second threaded holes in communication with a second interior of a corresponding one of the cavities of the second connection frame, each of the bolts connected to a respective one of the first threaded holes in the first interior and a corresponding one of the second threaded holes in the second interior.

2. The split connection frame according to claim 1, wherein the cavities of each of the first connection frame and the second connection frame comprise two cavities, and a gap between the two cavities of each of the first connection frame and the second connection frame is configured to be a fixing groove for connecting a sheet material.

3. The split connection frame according to claim 2, wherein each of the two cavities is further provided with a connection structure connected with a perpendicular frame which is perpendicular to the first connection frame or the second connection frame.

4. The split connection frame according to claim 3, wherein the connection structure is a connection hole corresponding to the perpendicular frame.

5. The split connection frame according to claim 4, wherein first end openings of the two cavities of the first connection frame and second end openings of the two cavities of the second connection frame are provided with a plug, the first end openings and the second end openings are arranged at a same side of the first connection frame and the second connection frame, protrusions are provided on the plug, each of the protrusions is in in interference fit with a corresponding one of the first end openings and the second end openings.

6. An assembled split frame door, comprising:

a plurality of independent frame doors connected to each other, the frame doors of the plurality of independent frame doors connected to each other via a split connection frame, the split connection frame comprising a first connection frame provided in a frame door and a second connection frame provided in an other frame door, the first connection frame provided with a slide rail groove, the second connection frame provided with a slide plate, the slide plate engaging the slide rail groove, the slide rail groove having a C-shaped cross section to wrap edges of the slide plate, the slide rail groove and the slide plate provided with first threaded holes and second threaded holes respectively, each of the first threaded holes corresponding to a respective one of the second threaded holes, and the slide rail groove and the slide plate fixedly connected via bolts, and each of the first connection frame and the second connection frame provided with cavities, each of the first threaded holes in communication with a first interior of a corresponding one of the cavities of the first connection frame and each of the second threaded holes in communication with a second interior of a corresponding one of the cavities of the second connection frame, each of the bolts connected to a respective one of the first threaded holes in the first interior and a corresponding one of the second threaded holes in the second interior.

7. The assembled split frame door according to claim 6, wherein the cavities of each of the first connection frame and the second connection frame comprise two cavities, and a gap between the two cavities of each of the first connection frame and the second connection frame is configured to be a fixing groove for connecting a sheet material.

8. The assembled split frame door according to claim 7, wherein each of the two cavities is further provided with a connection structure connected with a perpendicular frame which is perpendicular to the first connection frame or the second connection frame.

9. The assembled split frame door according to claim 8, wherein the connection structure is a connection hole corresponding to the perpendicular frame.

10. The assembled split frame door according to claim 9, wherein first end openings of the two cavities of the first connection frame and second end openings of the two cavities of the second connection frame are provided with a plug, the first end openings and the second end openings are arranged at a same side of the first connection frame and the second connection frame, protrusions are provided on the plug, each of the protrusions is in in interference fit with a corresponding one of the first end openings and the second end openings.

* * * * *